United States Patent [19]

Gottesman, deceased et al.

[11] Patent Number: 5,043,178

[45] Date of Patent: Aug. 27, 1991

[54] METHOD FOR THE EXTRACTION OF ROASTED AND GROUND COFFEE

[75] Inventors: Martin Gottesman, deceased, late of Paramus, N.J., by Karen Gottesman, executrix; Richard A. Pfluger, Maplewood; Ronald H. Skiff, West Orange, all of N.J.

[73] Assignee: Kraft General Foods, Inc., Glenview, Ill.

[21] Appl. No.: 470,296

[22] Filed: Jan. 25, 1990

Related U.S. Application Data

[63] Continuation-in-part of Ser. No. 150,488, Feb. 9, 1988, abandoned, which is a continuation of Ser. No. 880,344, Jun. 25, 1986, abandoned, which is a continuation of Ser. No. 703,351, Feb. 13, 1985, abandoned, which is a continuation-in-part of Ser. No. 469,531, Feb. 24, 1983, abandoned.

[51] Int. Cl.$^5$ ............................................. A23F 5/26
[52] U.S. Cl. ..................................... 426/432; 426/434
[58] Field of Search ............................... 426/432, 434

[56] References Cited

U.S. PATENT DOCUMENTS

| | | | |
|---|---|---|---|
| 3,088,394 | 5/1963 | Miornbill | 99/289 X |
| 3,092,515 | 6/1963 | Pike et al. | 134/25 |
| 3,148,069 | 9/1964 | Sjorgeu et al. | 426/432 |
| 3,862,347 | 1/1975 | Thijssen | 426/434 |
| 4,007,116 | 2/1977 | Gappa et al. | 210/676 |
| 4,364,964 | 12/1982 | Van der Stegen | 426/427 X |

OTHER PUBLICATIONS

Hanler, Pufication With Activated Carbon, 1974, Chemical Public, Co., Inc.; New York, pp. 74-86.
Switz et al., Coffee Processing Technology, 1963, Avi. Westport, Conn., p. 338.

Primary Examiner—Joseph Golian
Attorney, Agent, or Firm—Thomas A. Marcoux; Linn I. Grim; Thomas R. Savoie

[57] ABSTRACT

A method of extracting roasted and ground coffee is disclosed. Exraction water is fed to one end of an extraction vessel containing roasted and ground coffee, and coffee extract is with drawn from the other end. Flow of water to and from the vessel is intermittently halted, and extracted roasted and ground coffee is intermittently discharged from the vessel, while a portion of unextracted coffee is charged to the vessel at the other end. The movement of coffee in the extraction vessel is countercurrent relative to the flow of the extraction water. The method of the present invention is less complex, is more easily controlled, requires a lower capital investment and produces a more aromatic coffee extract of better flavor balance.

17 Claims, 1 Drawing Sheet

METHOD FOR THE EXTRACTION OF ROASTED AND GROUND COFFEE

TECHNICAL FIELD

The present application is a continuation-in-part of Ser. No. 150,488 filed Feb. 9, 1988, now abandoned, which is a continuation of Ser. No. 880 344 filed June 25, 1986, now abandoned; which is a continuation of Ser. No. 703,351 filed Feb. 13, 1985, now abandoned, which is a continuation-in-Part of Ser. No. 469,531, filed Feb. 24, 1983, now abandoned.

The present invention relates to a method for extracting roasted and ground coffee. More particularly, the invention involves feeding extraction water to one end of an extraction vessel containing roasted and ground coffee while withdrawing coffee extract from the other end of the vessel. Flow to and from the vessel may be periodically interrupted, and unextracted coffee is intermittently charged to the extraction vessel, while a portion of extracted coffee is simultaneously discharged. The invention yields a roasted and ground coffee extract of improved flavor quality. Improved flavor occurs at a higher concentration or higher yield than conventional extraction systems or a lower operating condition of time and temperature for equivalent yield or concentration. In either case flavor is substantially improved.

BACKGROUND ART

The extraction of roasted and ground coffee for soluble coffee processing is most often carried out in a fixed bed countercurrent extraction battery having between six and eight columns. Hot extraction water, typically at a temperature in excess of 160° C., is fed to the column containing the most spent coffee (that is, the coffee that has had the most solids extracted) so as to thermally hydrolyze the coffee. The extraction liquid progresses through columns containing increasingly less extracted coffee, becoming richer in coffee solids. The final column in the extraction train, from which coffee extract is withdrawn, contains the freshest (least extracted) coffee, which coffee is then atmospherically extracted. Periodically, after all the solids that are practically soluble and extractable have been removed from the spent coffee, the column containing said coffee is isolated from the battery and a new column containing fresh coffee is brought on stream. The flow of the extracting liquid is adjusted so that the hot extraction water is fed to the new most spent column and the corresponding adjustments made throughout the battery. Thus, the countercurrent extraction battery is not continuous and such a system requires considerable valving and piping (a complex manifold) to permit the desired flow adjustments. Typical countercurrent extraction batteries are described in U.S. Pat. No. 2,515,730 to Ornfelt and U.S. Pat. No. 2,915,399 to Guggenheim et al. as well as in "Coffee Processing Technology" by Sivetz and Foote, AVI Publishing, Westport, Conn., 1963, Vol. 1, pp 281-294.

It is an object of the present invention to extract soluble solids from roasted and ground coffee in a manner effective to preserve the flavor quality of said soluble solids.

It is another object of the present invention to provide a more nearly continuous method of extracting roasted and ground coffee, which method does not require the complex manifold associated with a conventional countercurrent extraction battery.

A further object of the present invention is to provide a method of extracting roasted and ground coffee which is more efficient than said countercurrent extraction battery, owing to the greater number of equivalent extraction stages practically obtainable with the method of the present invention.

SUMMARY OF THE INVENTION

It has now been found that the objects of the invention are met by a method of extracting roasted and ground coffee in a single extraction vessel. Extraction water is fed to one end of an extraction vessel and coffee extract is withdrawn from the opposite end of the extraction vessel. According to the invention, soluble solids are extracted from the roasted and ground coffee in a manner effective to maintain the flavorful quality of the coffee solids. Further, because of the improved efficiency of said extraction, a roasted and ground coffee extract can be produced having a higher soluble solids concentration or yield at lower temperature and retention time operating conditions, and an aroma profile which is more similar to brewed roasted and ground. Thus, a roasted and ground coffee extract of excellent and substantially improved flavor quality is always produced.

DISCLOSURE OF THE INVENTION

Figure 1:
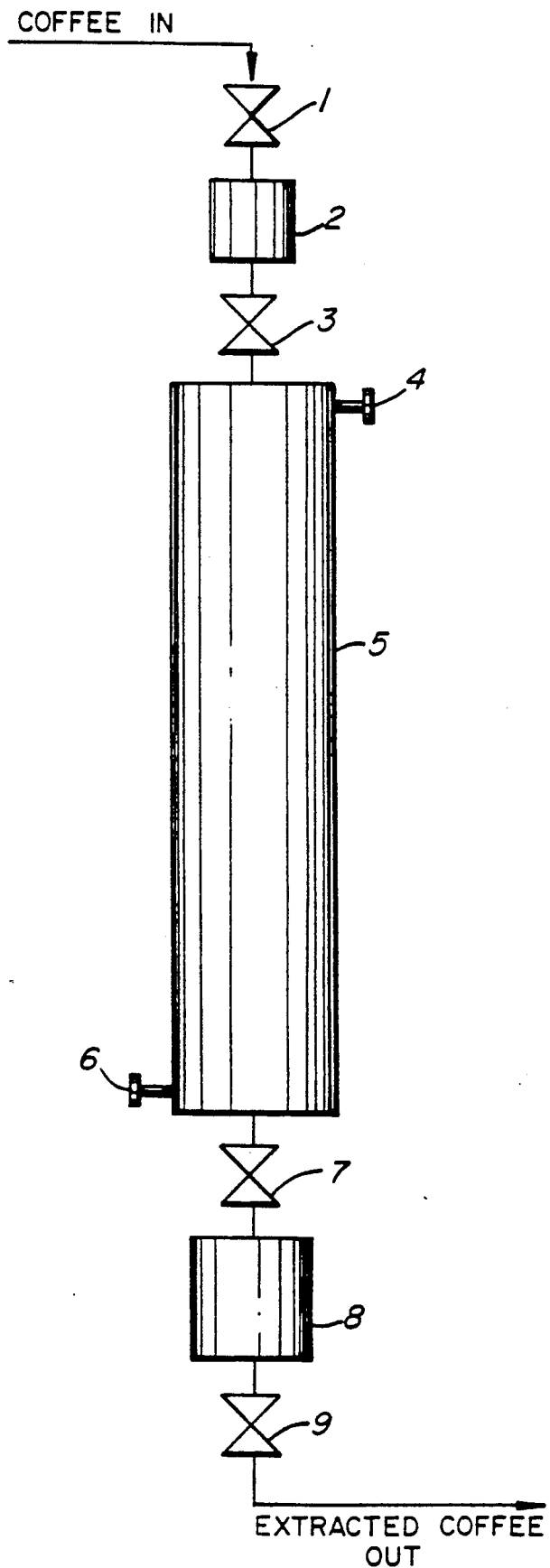
FIG. 1 is a front view of an extraction vessel for the extraction of roasted and ground coffee.

Roasted and ground coffee is extracted in an extraction vessel. Suitable vessels include those which allow for the contact of the roasted and ground coffee and the extracting liquid as said liquid flows through the vessel, as well as for the intermittent charging of the fresh coffee and discharging of the extracted coffee. The preferred vessel is an elongated column in which the roasted and ground coffee is maintained as a bed and the extracting liquid passes through the bed. The elongated column preferably has a length between about 7.5 m and 23.0 m. The diameter of the column is determined by the desired capacity and in view of the preferable superficial velocity range herein below described. Said column is situated vertically to provide the most convenient countercurrent flow of the extracting liquid and the roasted and ground coffee.

Inasmuch as the column is most conveniently situated vertically, it is also preferable to feed the extraction water to the bottom of said column and withdraw the coffee extract at the top of the column so that the extracting liquid flows upward through the bed of roasted and ground coffee and the movement of said coffee is downward. Periodically, flow to and from the vessel may be halted and unextracted coffee is intermittently charged to the extraction vessel, as a portion of spent coffee is discharged. The feeding of extraction water to and withdrawal of extract from the vessel may then be resumed. The coffee moves, of course, as a result of the intermittent discharging of extracted coffee, and the subsequent charging of the fresh roasted and ground coffee. In the case where the extraction water is fed to the bottom of the vessel, the fresh coffee is charged to the top of the vessel and the extracted coffee is withdrawn from the bottom in order to provide countercurrent movement of said coffee relative to the flow of the extracting liquid. Thus, situating an elongated column vertically allows the movement of the coffee through the column to be primarily caused by gravity. Of course, the flow of the extracting liquid and roasted and ground coffee can be reversed so that the extraction water is fed to the top of the vessel, but it is simply not as convenient to do so.

Intermittently, after a pre-determined period of time as described hereinbelow, the feeding of extraction water to the extraction vessel and the withdrawal of coffee extract therefrom may be temporarily halted. A portion of extracted roasted and ground coffee is discharged from one end of the vessel while a portion of fresh, unextracted roasted and ground coffee is charged to the other end of the extraction vessel. In the case of an elongated column, said portion is measured as against the volume of the coffee bed in said column where, for example, 10% of the total volume of the column is intermittently discharged. The preferred portion of extracted roasted and ground coffee intermittently discharged is between 4% and 20% of the volume of the coffee bed contained in the elongated column. Most preferred is intermittently discharging a volume of between 5 and 15%.

An equal volume of unextracted roasted and ground coffee may be charged to said column if the coffee is dry, even though roasted and ground coffee swells to nearly twice its original volume upon wetting, also concentrating and reducing the volume of the extracting liquid. So, if an equal volume of dry, fresh roasted and ground coffee replaces the discharged extracted coffee, said coffee may have difficulty properly expanding and may not therefore extract properly. However, in columns greater than fractions of a foot, diameter expansion does not appear to be a problem. Thus, the charge of dry coffee may be approximately one-half of the volume for small columns of extracted coffee that is discharged. Moreover, the flow rate of the extracting liquid must be adjusted so as to compensate for the water absorbed by the roasted and ground coffee. In another embodiment, the unextracted roasted and ground coffee is premoisturized prior to being charged to the elongated column, in which event, the volume of coffee simultaneously charged and discharged should be about equal.

Once the charging of the unextracted roasted and ground coffee and the discharging of the extracted coffee is completed, the flow of the extraction water to the vessel and the withdrawal of extract from the extraction vessel is resumed (assuming said flow had been previously halted). The whole operation can be made quite brief, generally not lasting more than a few minutes (depending on the size of the portion discharged), so that the method is more nearly continuous than conventional countercurrent fixed bed extraction. Alternatively, based on the specific equipment configuration, the flow of the liquid to and from the extraction vessel need not be halted, making the method of the present invention essentially continuous.

The charging of the fresh coffee and discharging of the extracted coffee may be by any of several methods. For example, in the case where the fresh roasted and ground coffee is charged at the top of an elongated column, a valve is briefly opened at the bottom of said column to discharge the desired portion of extracted roasted and ground coffee. Simultaneously, a valve at the top of the column is opened to charge the proper amount of unextracted roasted and ground coffee by the force of gravity. Both valves are then shut. This technique is not appropriate when the extraction vessel is maintained at a pressure greater than atmospheric.

Most preferably, the extraction vessel is charged and discharged from so-called blow cases located immediately above and below and communicating with said extraction vessel. Blow cases are isolated vessels of about the same volume as the unextracted coffee to be charged and the extracted roasted and ground coffee to be discharged, which blow cases are capable of withstanding a pressure equal to or slightly above the pressure maintained in the extraction vessel. The blow case above the column is then filled with the appropriate amount of fresh coffee and pressurized as with compressed air or a portion of liquid to a pressure slightly greater than the pressure maintained in said column. A valve is opened on the bottom of the column so as to fill the blow case with the discharged portion of coffee, whereupon said valve is shut. Nearly simultaneously, a valve on the top of the column is opened and the fresh roasted and ground coffee is forced into the column under pressure. The top blow case is subsequently isolated and flow to and from the column is resumed or continues. The use of said blow cases is relatively simple, efficient and nearly as rapid as charging and discharging the extraction vessel by gravity.

FIG. 1 shows one of the preferred embodiments for operating the method of the present invention. At steady-state conditions, the extraction vessel 5 is filled with a bed of roasted and ground coffee which has been extracted in varying degrees. Feed water is fed to the first end of the extraction vessel 6 and coffee extract is withdrawn from the second end of the extraction vessel 4. Unextracted roasted and ground coffee is periodically admitted through valve 1 into blow case 2. Valves 3 and 7 are simultaneously opened intermittently so as to charge the unextracted roasted and ground coffee from blow case 2 to the second end of the extraction vessel 4 and discharge a portion of extracted roasted and ground coffee from the first end of the extraction vessel 6 to blow case 8. Valves 3 and 7 are then closed. Valve 9 is then opened to discharge the extracted roasted and ground coffee from blow case 8. Additional unextracted roasted and ground coffee is admitted through valve 1 into blow case 2 and the procedure is repeated.

Having thus described the operation of the present invention, the significantly improved processing efficiency and coffee extract quality which result from said operation are next considered. The present method is more efficient for the extraction of roasted and ground coffee solids because it affectively has more stages than a conventional fixed bed countercurrent extraction battery of six or eight columns, the term "stage" being used in its conventional chemical engineering sense as described in Perry, *Chemical Engineers' Handbook, 3rd Edition,* McGraw Hill, 1950, p. 716, hereby incorporated by reference. Said improved efficiency results in an increased coffee solids concentration in the withdrawn coffee extract as compared to a conventional extraction battery at equivalent operating parameters. Additionally, a higher level of coffee aromatics is found in the coffee extract of the present invention as measured by gas chromatograph versus a conventional extraction battery, again with all operating parameters maintained constant. Further, the levels of coffee aromatics are more balanced approaching levels found in the starting roasted and ground coffee. For applications where the coffee extract is spray-dried, increased coffee solids concentration is particularly important for the preservation of flavorful coffee aromas to a finished soluble coffee product because a dilute coffee extract generally requires substantial downstream concentration, as for example by evaporation, prior to drying. Such downstream concentration typically results in a significant loss and/or degradation of flavorful coffee aromatics, said loss and/or degradation generally being avoided by the operation of the present invention. As such, the higher soluble solids concentration of the invention is much desired and preferred for flavor retention in soluble coffee processing and has been found to yield a soluble coffee product of excellent organoleptic quality.

For situations where dilute extract can be employed, the flavor of the final extract is much closer to and the aroma is balanced as in the starting roasted and ground flavor compared to extracts using conventional multi-column extraction. Not only is yield maintained but the quality of the coffee extract is substantially improved.

Extraction yield, that is, the weight of soluble coffee solids extracted per weight of fresh roasted and ground coffee charged, quantifies the degree of the coffee extraction. In the present invention, extraction yield is better than a conventional extraction battery at equivalent operating parameters. Yield is generally dependent upon the superficial velocity of the extracting liquid through the bed of roasted and ground coffee, the retention time of the coffee in the extraction vessel, the temperature of the extracting liquid (as described hereinbelow), and the total weight of extraction water per weight of roasted and ground coffee charged. "Extracting liquid" refers to the liquid flowing through the vessel which is fed as extraction water and becomes increasingly rich in soluble coffee solids until being withdrawn from the vessel as coffee extract. The superficial velocity of said liquid and the amount of liquid fed through the roasted and ground coffee contained in the elongated column are related to the degree of extraction and washing to which the coffee is subjected. A lower superficial velocity increases the retention time of the liquid in the column and typically favors greater extraction. At conditions of atmospheric extraction, that is 70° C. to 100° C., a higher superficial velocity requires a taller extraction vessel to achieve the same degree of extraction but provides better washing (and yield) from the coffee particles.

At conditions where the extraction is carried out above atmospheric conditions (hydrolysis conditions) of 100°–180° C., lower liquid retention times are favored to prevent aroma degradation and, therefore, higher superficial velocities are preferred.

It has been found that a superficial velocity between 0.03 m/min and 0.3 m/min is convenient for use in the present invention, with a velocity of 0.03 to 0.15 preferred and 0.06 to 0.15 m/min being particularly preferred for producing an extract which may be mostly atmospheric solids having a high concentration. A superficial velocity of 0.15 to 0.30 m/min is preferred for hydrolysis conditions or a higher roasted yield (23%–50% roasted yield) whereby the higher velocity improves the aroma balance of extract giving a product aroma closer to the original roasted and ground coffee. Of course, a superficial velocity outside the range may be used with a corresponding decrease in extraction efficiency at a lower velocity or highly dilute extract at the higher velocity.

The total weight of extraction water per weight of roasted and ground coffee charged for producing higher extract concentrations than conventional extraction is maintained at about what it is for conventional extraction, that is between about 15:1 and 40:1. This is to say that each pound of roasted and ground coffee preferably has about 15 lbs. to 40 lbs. of extracting liquid flow past it while in the extraction vessel. For producing outstanding extract flavor at hydrolysis conditions where higher superficial velocities are used, extraction water per weight of roasted ground coffee charged is preferably maintained at 40:1 to 90:1.

Another operating variable effecting yield, the retention time of the roasted and ground coffee in the extraction vessel, is also preferably maintained at about what it is for conventional extraction, between about 75–240 minutes and usually 90 to 240 minutes. Usually ground retention times of 90 to 140 mins. produce excellent flavor with a profile close to the starting roasted and ground coffee times of 140 to 240 help produce flavorful extracts at higher concentration. Having thus set retention time and the portion of extracted roasted and ground coffee that is intermittently discharged as hereinbefore described, the frequency of the periodic charging and discharging of the roasted and ground coffee is fixed. This is because the total retention time multiplied by the fraction of the extraction vessel which is intermittently discharged necessarily equals the interval between the charging and discharging. For example, if a total retention time is selected as 200 minutes and about 12.5% of the height of the column is intermittently discharged, the period between the periodic operations amounts to 25 minutes. The net effect is to provide the equivalent of an eight column countercurrent extraction battery in a single-extraction vessel, eliminating the complexity of said battery.

As hereinbefore described, hydrolysis of the coffee takes place in the column to which the extraction water is fed in a conventional battery and atmospheric extraction takes place in the column containing the fresh roasted and ground coffee from which the coffee extract is withdrawn. The roasted and ground coffee extraction method of the present invention offers increased flexibility, the results achieved being dependent upon the temperature at which the extraction water is fed to the extraction vessel. In a first embodiment, atmospheric extraction of the roasted and ground coffee is accomplished by feeding the vessel with extraction water at a temperature of between about 70° C. and 100° C. and maintaining said temperature throughout the full height of the column. The pressure in the extraction vessel is typically at or slightly above atmospheric pressure. The extracted roasted and ground coffee intermittently discharged may then be charged to another extraction vessel so as to hydrolyze said coffee and extract the remaining available soluble coffee solids so produced. In the second extraction vessel, hydrolysis is accomplished by feeding the extraction water to the extraction vessel at a temperature in excess of 100° C. and less than about 232° C. Said temperature may be maintained throughout the full height of the vessel such as by insulating or jacketing the vessel, or the temperature may be allowed to decrease through normal heat loss or reducing the jacket temperature of said vessel. The pressure in the column is significantly above atmospheric, corresponding at least to the saturation pressure of water at the temperature selected. Blow cases or other suitable means for charging and discharging the coffee under the appropriate pressure must, of course, be used.

In a second embodiment, the method of the present invention may be varied so as to provide for both atmospheric extraction and hydrolysis in a single extraction vessel. The extraction water is fed to the vessel at a temperature in excess of 100° C. so as to induce some mild hydrolysis in the mostly extracted roasted and ground coffee which is initially contacted by said water. The temperature in the vessel is then progressively lowered by circulating a cool liquid through the vessel jacket or by heat loss so that said temperature may be between about 70° C. and 100° C. by the time the extracting liquid reaches the freshest roasted and ground coffee at the opposite end of the extraction vessel. In this way, the coffee which is extracted at the lowest temperature is atmospherically extracted and the most spent coffee is extracted at the highest temperature in much the same way as in a conventional extraction system. Although operation in this manner is perhaps less complex, experience indicates that precise temperature control within a single extraction vessel is often difficult to achieve.

Atmospheric extraction in one vessel followed by hydrolysis in a second extraction vessel or even in a fixed bed, countercurrent battery is more flexible, particularly because most of the coffee flavor and aromas are atmospherically extracted and so, the hydrolysis operation is operated at higher temperature and is not then constrained by flavor considerations.

The present method, although not strictly continuous, is certainly more nearly so than a countercurrent extraction battery, with the flow of extract being interrupted intermittently and then only for a brief period, preferably less than a few minutes and, if conditions permit, not at all. The nearly continuous operation permits a much closer approach to steady state conditions so that the withdrawn extract has a flatter more uniform concentration profile than the extract withdrawn from a countercurrent battery. Said concentration profile may be made even flatter by premoisturizing the roasted and ground coffee prior to charging the same to the extraction vessel. Dry roasted and ground coffee will typically adsorb about its own original weight of extract as moisture and so, if such coffee is charged to the extraction vessel, said coffee will preferentially adsorb water from the extraction liquid initially contacting it, concentrating the liquid and disturbing the concentration profile. Thus, the roasted and ground coffee can be premoisturized to between 35% by weight and 60% by weight before being charged to the extraction vessel. The premoisturizing may be with water or with coffee extract having between about 10% by weight and 50% by weight coffee solids. The use of extract for premoisturizing is useful because said extract adds coffee solids to the roasted and ground coffee, which tends to increase the equilibrium concentration of the withdrawn extract substantially. Regardless of the liquid used for premoisturizing, said premoisturizing also aids in determining the portion of unextracted roasted and ground coffee intermittently charged to the extraction vessel, as hereinbefore described.

The increased concentration of the withdrawn extract of the present invention is essential to one mode of operation of the present invention. Equally important is the opportunity to produce extremely flavorful coffee extract having the characteristic flavor of the original roasted and ground beans at equal or greater concentration or yield, all other processing conditions being the same. Concentration ranges upwardly to about 55% by weight as extract exits the extraction vessel are achievable, particularly when the roasted and ground coffee is premoisturized with coffee extract as hereinbefore described.

In the first embodiment described previously wherein solely atmospheric extraction is accomplished in the extraction vessel or higher concentration are desired under conditions of hydrolysis using superficial velocities of 0.03 to 0.15 m/min, the exiting concentration is generally greater than about 10%, typically greater than about 20%, preferably greater than about 30%, and, most preferably greater than about 40% by weight coffee solids. Higher exiting concentrations are achievable at the same water to coffee ratios used in conventional extraction batteries operated at identical conditions. Similarly, in the case where atmospheric extraction and mild hydrolysis are accomplished at high water to coffee ratios and high draw off fractors (and usually short grounds retention times of 75-140 minutes) in the same extraction vessel and in applications where solely hydrolysis is accomplished, the exiting extract concentration is generally greater than about 5; for example 4% or greater, typically approaching 10% or more.

The benefit of said increased exit concentration is realized in terms of downstream processing efficiency, cost savings, and flavor improvement. Typically, coffee extracts are subjected to substantial concentration steps, generally evaporation, prior to drying. Said concentration steps are energy intensive and generally result in a substantial loss of flavorful coffee aromatics along with the water phase which is being driven off. Methods are known for recovering a percentage of these flavorful aromatics, for example condensation, distillation, and absorption, but these methods are capital and energy intensive and less than 100% successful.

The present invention is extremely preferred over these prior art systems in that coffee extracts are generated at such high concentrations and with such high and balanced levels of coffee aromatics that either limited or, preferably, no concentration is needed downstream for the coffee extract to be suitable for efficient drying, both from an energy and flavor retention standpoint.

The following examples are intended to illustrate certain embodiments of the present invention. The examples are not meant to limit the invention beyond what is claimed below.

EXAMPLE 1

1. For the purpose of comparison, a countercurrent fixed bed extraction battery (countercurrent battery) having 6 columns of 0.25 m diameter by 5.5 m height and charged with 82 kg of roasted and ground coffee each was operated after equilibrium was attained. The cycle time was approximately 35 min. per cycle for a total retention time of the coffee in the battery of about 175 min. A sixth column was a turnaround column being discharged and changed with coffee so that five of the six columns are extracted at any one time. The extraction water was fed to the battery at about 130° C., effecting some mild thermal hydrolysis, as well as atmospheric extraction. The total weight ratio of water fed per weight of roasted and ground coffee was 29.6:1.

The resulting extract had a soluble coffee solids concentration of about 6.7% by weight. The overall yield of the roasted and ground coffee on a dry basis was about 28% by weight.

2. A vertical, cylindrical elongated column having a diameter of 0.1 m, a height of 15.2 m and holding about 44 kg. of roasted and ground coffee was used. The steel column had two 10 cm. ball valves mounted on either end for charging and discharging the coffee. A hopper was mounted above the column, communicating with said column through the ball valve. An additional cylindrical length, representing about 12.5% of the volume of the column, was mounted vertically below the column as a blow case, communicating with the column through the bottom ball valve. A third 10 cm. ball valve was mounted on the bottom of the blow case. Water was pumped through a heat exchanger and into the column through a flow distributor such as a bayonet mounted in the column, slightly above the bottom of said column. The coffee extract was withdrawn through a bayonet mounted in the column, slightly below the top of said column. The extract was pumped into a tank from the extraction column. Roasted and ground coffee was placed in the hopper and premoisturized by mixing manually with a liquid. The bottommost ball valve on the blow case was closed and flow to and from the column was halted. The ball valves on the two ends of the column were essentially simultaneously opened, allowing the roasted and ground coffee to charge to the column by gravity and the extracted coffee to fill the blow case whereupon, both valves were shut. Flow to and from the column was then resumed. The contents of the blow case were allowed to cool and the blow case was emptied by opening the bottom most ball valve.

For the first run (Run 1), about 12.5% of the volume of coffee in the column was intermittently discharged into a blow case adjacent to the bottom of the column every 25 min. for a total retention time in the vessel of 200 min. An equal volume of unextracted roasted and ground coffee premoisturized with water to 58% by weight moisture was then charged to the top of the column through a blow case located thereon. Extraction water was fed to the bottom of the column at about 88° C., effecting atmospheric extraction. The total weight ratio of water fed per weight of roasted and ground coffee was 29.6:1.

The resulting extract had a soluble solids concentration of about 13.8% by weight. The overall dry basis yield of the roasted and ground coffee was about 23% by weight.

A second run (Run 2) was carried out with identical conditions except that the roasted and ground coffee was premoisturized with a portion of the coffee extract withdrawn from the top of the column and therefore the water fed was adjusted to compensate for the water contained in the premoisturizing extract. The concentration of the resulting extract was about 36.6% by weight soluble solids. The simple expedient of premoisturizing with extract increased the concentration nearly three-fold over what it was for the first run.

A third run (Run 3) was conducted in a column of essentially the same overall configuration as that in Runs 1 and 2 of Example 2 and the countercurrent battery of this example having a diameter of 0.25 m and a height of 7.9 m holding about 140 kg of roasted and ground coffee. Conditions were similar to the countercurrent battery except that the ratio of water fed per weight of roasted and ground coffee was increased still further to about 76:1 and the temperature of the extraction water decreased to about 120° C.

The extract of this run (Run 3) came closest in flavor to the starting roasted and ground coffee of any of the Runs 1–3 of Example 2 or of this Example again demonstrating the increased efficiency of this invention at water/coffee ratios not achievable in conventional fixed bed percolators. The results are shown in Table I which follows.

It can readily be seen that increasing the ratio of water per weight of roasted and ground coffee as in Run 3 reduces the temperature necessary to achieve an equivalent yield and also the extract retention time in the extractor. This in turn results in a further reduction in the generation of undesirable degradation aroma's (furfural) but with even improved efficiency of extraction of desirable aromas methyl furan, 2-3-pentanedione and diacetyl. An added benefit is that increases in ratio of water per weight of roasted and ground coffee can easily be achieved without the limitations in pressure drop imposed by the complex manifolding in conventional fixed bed extraction batteries.

TABLE I

|  | Run 1 | Run 2 | Run 3 | Countercurrent Battery |
|---|---|---|---|---|
| Extraction Feed Water Temp. | | | | |
| (°C.) | 88 | 88 | 120 | 130 |
| (°F.) | 190 | 190 | 200 | 366 |
| Water/Coffee Ratio | 29.6:1 | 20.9:1 | 76.2:1 | 29.6:1 |
| Draw Off Factor | 1.55 | 0.65 | 6.0 | 3.9 |
| Draw Off Extract Concentration % | 13.8 | 36.6 | 4.7 | 6.7 |
| Yield In Wt. % | | | | |
| As Is | 21.4 | 24.2 | 28 | 26 |
| Dry Basis | 23 | 26 | 30 | 28 |
| Superficial Velocity | | | | |
| Ft/Min. | 0.24 | 0.25 | 0.71 | 0.93 |
| M/Min. | 0.07 | 0.08 | 0.22 | 0.28 |
| Pulse % | 12.5 | 12.5 | 10 | 20% of total in each extrator column |
| Cycle Time Min. | 25 | 25 | 10 | 35 |
| Prewet Lbs. | 4.8 | 34.8 | 34.8 | 0 |
| Liquid Retention Time Min. | 212 | 197 | 37 | 97 |
| Grounds Retention Time Min. | 200 | 200 | 100 | 175 |
| Diameter Inch | 3.9 | 3.9 | 10 | 10 |
| Height Ft. | 50 | 50 | 26 | 90 |

Although the coffee extracted in the countercurrent battery gave a slightly higher yield than Run 1 and Run 2, it is attributable to the higher extraction temperature for said method which was required because of equipment limitations. The greater efficiency of the present invention is seen in the higher concentration of the extract produced by the instant method, which concentration was nearly twice that of the conventionally produced extract in the first case despite using the same weight of water to weight of coffee in each method. When the recycled extract technique is employed, the concentration increased six fold. The higher concentration ext%act is beneficial in that a high concentration extract exhibits greater aroma retention and such an extract requires less concentrating before drying, lowering equipment requirements and operating costs.

EXAMPLE 2

1. In a second comparative example, a countercurrent fixed-bed extraction battery (1st fixed bed) having six columns of 0.25 m diameter and 5.2 m height and charged with 82 kg of roasted and ground coffee each, was operated after equilibrium was attained. The cycle time was approximately 32 mins. with five columns on stream at any time (the sixth being emptied and refilled) giving a total retention time of 160 mins. The extraction water was fed to the battery at about 350° F. effecting some thermal hydrolysis as well as atmospheric extraction. The total weight of water fed per weight of roasted and ground coffee was 15:1.

The overall yield of the roasted and ground coffee on a dry basis was about 38% by weight resulting in an extract which had a soluble coffee solids concentration of about 23.8% by weight.

2. A vertical, cylindrical elongated column, similar in overall configuration to that in Example 1, having a diameter of 0.25 m, a height of 13.6 m and holding about 227 kg. of roasted and ground coffee was used. The steel column had two, 10 cm. ball valves mounted on either end for charging and discharging the coffee. A vessel was mounted above the column, communicating with said column through the ball valve and a second vessel representing about 10% of the volume of the column was mounted vertically below the column, communicating with the column through the bottom ball valve. This lower vessel acted as a blowcase and this blowcase carried a third 10 cm. ball valve at its lower end.

Water was pumped through a heat exchanger and into the column through a flow distributor such as a bayonet, mounted in the column slightly above the bottom of said column. The coffee extract was withdrawn through a bayonet mounted in the column, slightly below the top of said column and pumped into a tank.

Roasted and ground coffee was fed into the upper vessel with no premoisturization, the vessel isolated and then pressurized using air at about 10 bar. In this case flow to and from the column was not interrupted. The ball valves on the two ends of the column were essentially simultaneously opened, allowing the roast and ground coffee to charge into the column under the effect of the air overpressure and the extracted coffee to fill the blowcase whereupon both valves were closed. The contents of the blowcase were discharged by pressurizing the blowcase using air and then opening the blowcase lowermost valve, thus conveying the spent grounds and water to a spent grounds hopper.

In a first run (Run 1) about 10% of the volume of coffee in the column was intermittently discharged into the blowcase every 10 mins. for a total retention time in the vessel of about 100 mins. An equal volume of unextracted roasted and ground coffee was then charged to the top of the column through the charge vessel. Extraction water was fed to the bottom of the column at a temperature of about 320° F. effecting atmospheric extraction and mild hydrolysis of the roasted and ground coffee. The total weight ratio of water fed per weight of roasted and ground coffee was 31:1.

The resulting extract had a soluble solids concentration of about 22.4% by weight. The overall dry basis yield of the roasted and ground coffee was about 38% by weight.

A second run (Run 2) was carried out in the identical column of Run 1. In this run, conditions were as in Run 1 except that the total weight ratio of water fed per weight of roasted and ground coffee was increased to about 53:1 and the temperature of the extraction water was decreased to about 300° F. The resulting extract had a soluble solids concentration about 10% by weight and the overall dry basis yield of the roasted and ground coffee was about 40% by weight.

A second fixed bed extraction (2nd fixed bed) run was made at a high draw off factor for comparison to Run 2.

The four extracts resulting from the fixed bed extraction battery run of this example and the two runs from the elongated pulsed column (Run 1, Run 2) were subsequently analyzed by gas chromatography.

The aroma results set forth herein are obtained by using purge and Trap Gas Chromatography. The percent aroma recovery values are derived by rationing the G.C. count of the extract (corrected or extracted yield) over the G.C. count of the starting roasted and ground coffee and multiplying by 100.

Operating condition and the results of the GC analysis described above are shown in Table 2.

TABLE 2

| | Run 1 | Run 2 | 1st Fixed Bed | 2nd Fixed Bed |
|---|---|---|---|---|
| Operating Conditions | | | | |
| Extraction Feed Water Temp. (°F.) | 320 | 300 | 350 | 360 |
| Water/Coffee Ratio | 31.1 | 53.3 | 15.0 | 24.7 |
| Draw Off Factor | 1.7 | 4.0 | 1.6 | 4.0 |
| Drawn Off Extract Concentration % | 22.4 | 10 | 23.8 | 12.5 |
| Yield In Wt. % Dry Basis | 38 | 40 | 38 | 50 |
| Superficial Velocity | | | | |
| Ft/Min. | .49 | .84 | .54 | .63 |
| M/Min. | 0.15 | 0.26 | 0.16 | 0.19 |
| Pulse % | 10 | 10 | 20 | 20 |
| Cycle Time Min. | 10 | 10 | 32 | 45 |
| Prewet Lbs. | 0 | 0 | 0 | 0 |
| Liquid Retention Time Min. | 91.6 | 53 | 150 | 126.1 |
| Grounds Retention Time Min. | 100 | 100 | 160 | 225 |
| Diameter Inch | 10 | 10 | 10 | 10 |
| Height Ft. | 45 | 45 | 80 | 80 |
| Aroma Results - % recovered from starting R & G | | | | |
| Total FID % | 118 | 138 | 130 | 394 |
| Degradation Product | | | | |
| Furfural % | 373 | 232 | 956 | 1220 |
| Flavorful Volatiles | | | | |
| Diacetyl % | 160 | 238 | 142 | 168 |
| 2-3 Pentenedione % | 140 | 158 | 128 | 124 |
| 2-Methyl Furan % | 20 | 31 | 20 | 18 |

It can be readily seen that the Runs 1, 2 and 1st fixed bed summarized in Table 2 resulted in essentially the same extraction yield but that practice of this invention has resulted in a coffee extract which is closer in aroma balance to that of the starting roast and ground coffee. Comparing directly to the data from the 1st fixed-bed extraction battery with those from Run 1, it can readily be seen that in order to achieve the same extraction yield as the current invention with essentially the same extract concentration, the conditions of extraction water temperature and grounds retention time had to be increased. The results of these changes are that in the fixed bed the coffee extract is subjected to harsher time/temperature exposure.

The benefits of the greater efficiency extraction of the present invention can be appreciated by studying the gas chromatographic data in Table 2. In Run 1, the generated level of furfural is almost one third of that in the fixed-bed extractor. Furfural is commonly used as an indicator of flavor degradation through coffee processing. Secondly, the overall G.C. counts are equivalent indicating a better balance of light desirable aroma compared to undesirable furfural. In addition the efficiency of extraction of such desirable coffee aromas as 2-methyl furan and 2-3-pentanedione by the method of this invention is equal to or superior to that of conventional fixed bed extraction. This greater efficiency therefore results in an extract having an aroma balance closer to that of the starting roasted and ground coffee.

Comparing the data in Table 2, Run 1 and 2 of the present invention it can readily be seen that further increasing the ratio of water per weight of roasted and ground coffee as in Run 2 reduces the temperature necessary to achieve an equivalent yield and also the extract retention time in the extractor. This in turn results in a further reduction in the generation of undesirable degradation products as evidenced by the lower furfural level, but with even improved efficiency of extraction of desirable aromas such as 2-methyl furan and 2-3-pentanedione. An added benefit of the invention is that increases in ratio of water per weight of roasted and ground coffee can easily be achieved without the limitations in pressure drop imposed by the complex manifolding in conventional fixed-bed extraction batteries.

We claim:

1. A method of extracting roasted and ground coffee in a more efficient manner than by conventional column extraction to produce a highly flavorful coffee extract closer to initial roast and ground coffee flavor which comprises:
    (a) feeding extraction water to the bottom end of an elongated vertical column extraction vessel containing the most spent extracted roasted and ground coffee, said most spent coffee being extracted at the highest extraction water temperature employed in the extraction as is done in a countercurrent extraction system;
    (b) contacting said extraction water having a superficial velocity between 0.03 m/min. and 0.3 m/min. at a temperature of 70° C. to 232° C., said temperature being maintained constant through the column or being allowed to decrease during extraction, with said extracted roasted and ground coffee in a countercurrent nearly continuous operation for a period sufficient to produce a final extract concentration of about 5% to about 55% coffee solids by weight and produce a substantially better flavored product closer in flavor and balance to the unextracted roasted and ground coffee extracted by this process than is conventially produced in multicolumn, countercurrent exactions;
    (c) withdrawing a coffee extract from the top end of said vessel, said extract having greater aroma retention and higher quality being closer to said unextracted roasted and ground flavor;
    (d) intermittently discharging 4% to 20% of the volume of extracted roasted and ground coffee at the bottom of the extraction vessel into a bottom blow case, said discharged extracted coffee containing feed water;
    (e) simultaneously charging a volumetric portion of unextracted dry roasted and ground coffee sufficient to allow swelling upon moistening in the extraction column or an approximately equal volumetric portion of premoistened roast and ground coffee from a top blow case into the extraction column, said process operating in an essentially continuous countercurrent fashion while intermittently introducing fresh coffee to the top of the extractor and discharging moist spent extracted coffee and wash water form the bottom of the extractor.

2. A method as in claim 1 which further comprises halting the flow of liquid to and from the extraction vessel during the period that the coffee is being charged and discharged.

3. A method as in claim 1 wherein the extraction vessel is a vertical, elongated column having a length between about 7.5 and 23.0 m, and a diameter whereby the superficial velocity is between 0.03 m/min. and 0.3% m/min. and extraction water flow is continuous.

4. A method as in claim 1 which further comprises premoisturizing the unextracted roasted and ground coffee to a moisture between 35% by weight and 60% by weight prior to charging said coffee to the extraction vessel.

5. A method as in claim 4 wherein water is used to premoisturize the unextracted roasted and ground coffee.

6. A method as in claim 4 wherein coffee extract is used to premoisturize the unextracted roasted and ground coffee.

7. The method of claim. 1 wherein the superficial velocity is 0.06 m/min. to 0.15 m/min. and the extract water temperature is 70° C. to 232° C. to produce a final extract concentration of greater than 10% to about 55% coffee solids by weight and produce a higher solids concentration than is conventionally produced in multicolumn, countercurrent extraction of the same coffee.

8. The method of claim 1 wherein the superficial velocity is 0.15 m/min. to 0.30 m/min. and the extraction water temperature is 70° C. to 180° C. to produce a final extract concentration of 4% or greater and approaching, 10% or more having a substantially improved flavor and balanced flavor compared to conventionally extracted coffee said flavor and flavor balance approaching unextracted roasted and ground coffee employed for extraction in this process.

9. A method as in claim 7 wherein the extraction water is fed to the extraction vessel at a temperature between about 70° C. and 180° C.

10. A method as in claim 9 wherein the temperature in the extraction vessel is maintained between about 70° C. and 100° C.

11. A method as in claim 1 wherein the extraction water is fed to the extraction vessel and maintained in the extraction vessel at a temperature of between about 70° C. and 180° C., and said extraction water concentration is increased to about 10% to about 55% by weight.

12. A method as in claim 1 wherein the extraction water is fed to the extraction vessel at a temperature between 100° C. and 180° C., which temperature is reduced throughout the height of the vessel.

13. A method as in claim 1 wherein the extraction water is fed to the extraction vessel at a temperature between 100° C. and 180° C. so as to hydrolyze the coffee in the lower portion of the extraction vessel, which temperature falls to between 70° C. and 100° C. at the upper portion of the column so that the roasted and ground coffee in said upper portion is atmospherically extracted.

14. A method as in claim 1 which further comprises atmospherically extracting the roasted and ground coffee in the extraction vessel of claim 1 and, subsequently, hydrolyzing the intermittently discharged portion of roasted and ground coffee in a countercurrent fixed bed extraction battery.

15. A method as in claim 1 which further comprises discharging the extracted roasted and ground coffee into a blow case and, charging unextracted roasted and ground coffee to the extraction vessel through a blow case that has been pressurized to a pressure equal to or slightly above the pressure in said extraction vessel.

16. The method of claim 7 in which the extraction water temperature is 70° C. to 180° C. and the water to coffee ratio is 15:1 to 40:1.

17. The method of claim 8 in which the water to coffee ratio is 40:1 to 90:1.

* * * * *